(12) United States Patent
Okuhata et al.

(10) Patent No.: US 11,398,761 B2
(45) Date of Patent: Jul. 26, 2022

(54) MOTOR COMPRISING COOLANT FLOW PATH

(71) Applicant: NIDEC TOSOK CORPORATION, Kanagawa (JP)

(72) Inventors: Yoshihisa Okuhata, Kanagawa (JP); Tadayuki Hatsuda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 295 days.

(21) Appl. No.: 16/232,087

(22) Filed: Dec. 26, 2018

(65) Prior Publication Data

US 2019/0199160 A1 Jun. 27, 2019

(30) Foreign Application Priority Data

Dec. 27, 2017 (JP) .............................. JP2017-252406

(51) Int. Cl.
*H02K 5/20* (2006.01)
*H02K 11/33* (2016.01)
*H02P 6/10* (2006.01)
*H02K 9/00* (2006.01)
*H02K 9/19* (2006.01)
(Continued)

(52) U.S. Cl.
CPC ................. *H02K 5/20* (2013.01); *H02K 9/00* (2013.01); *H02K 9/19* (2013.01); *H02K 11/0094* (2013.01); *H02K 11/25* (2016.01); *H02K 11/33* (2016.01); *H02P 6/10* (2013.01); *H02P 6/16* (2013.01); *H02P 29/64* (2016.02); *H02P 29/68* (2016.02)

(58) Field of Classification Search
CPC ....... H02K 1/20; H02K 9/005; H02K 11/0094
See application file for complete search history.

(56) References Cited

U.S. PATENT DOCUMENTS

2006/0208660 A1* 9/2006 Shinmura ............... B60L 50/50
315/209 R
2011/0001355 A1* 1/2011 Abadia ................... B60L 50/00
307/10.1
(Continued)

FOREIGN PATENT DOCUMENTS

CN 103312261 8/2016
CN 106230196 12/2016
(Continued)

OTHER PUBLICATIONS

Kimura (JP 2015042131 A) English Translation (Year: 2015).*
Ezaki (JP 2013118134 A) English Translation (Year: 2013).*

*Primary Examiner* — Tulsidas C Patel
*Assistant Examiner* — Robert E Mates
(74) *Attorney, Agent, or Firm* — JCIPRNET

(57) ABSTRACT

A motor includes: a housing that accommodates a stator that has a field coil and a rotor; an inverter that is provided in the housing; a voltage boosting circuit that has a reactor provided in the housing; and a coolant flow path that is provided at a position at which the coolant flow path overlaps with the inverter and the voltage boosting circuit in the housing in a diameter direction, and the inverter has a control board that controls a drive current or a drive voltage and a drive element that is provided on the side of the housing with respect to the control board and supplies power to the field coil in accordance with control from the control board.

7 Claims, 7 Drawing Sheets

(51) Int. Cl.
*H02P 29/68* (2016.01)
*H02K 11/00* (2016.01)
*H02K 11/25* (2016.01)
H02P 6/16 (2016.01)
H02P 29/64 (2016.01)

(56) References Cited

U.S. PATENT DOCUMENTS

| | | | | |
|---|---|---|---|---|
| 2011/0039649 | A1* | 2/2011 | Tanae | H02K 11/048 |
| | | | | 475/5 |
| 2013/0049495 | A1* | 2/2013 | Matsuo | G06F 16/178 |
| | | | | 310/53 |
| 2013/0241327 | A1 | 9/2013 | Soma et al. | |
| 2014/0313806 | A1* | 10/2014 | Shinohara | H01L 23/473 |
| | | | | 363/141 |
| 2017/0008554 | A1* | 1/2017 | Hirotani | H02K 11/024 |

FOREIGN PATENT DOCUMENTS

| | | | | | |
|---|---|---|---|---|---|
| EP | 2639946 | | 7/2017 | | |
| JP | 2013118134 | A * | 6/2013 | ......... | H05B 45/3725 |
| JP | 2013192372 | | 9/2013 | | |
| JP | 2015042131 | A * | 3/2015 | | |

* cited by examiner

MOTOR COMPRISING COOLANT FLOW PATH

CROSS REFERENCE TO RELATED APPLICATIONS

The application claims priority under 35 U.S.C. § 119 to Japanese Patent Application No. 2017-252406 filed on Dec. 27, 2017. The entire content of which is incorporated herein by reference.

BACKGROUND

Technical Field

The disclosure relates to a motor that supplies a drive force to a vehicle or the like.

Description of Related Art

For driving a motor that provides power to a vehicle or the like, a technology of performing control using an inverter circuit is known. In relation to a motor in the related art, for example, a motor provided with a coolant flow path in a motor housing in which a control circuit, a stator, and a rotor are accommodated together is known.

However, using a voltage boosting circuit that boosts the power source voltage is not taken into consideration in the technology disclosed in relation to the motor in the related art. A voltage boosting circuit includes a reactor with a relatively larger size than that of a voltage lowering circuit and the like, and it is not possible to efficiently perform cooling in a case in which a voltage boosting circuit is used in the motor in the related art.

SUMMARY

According to an aspect of a motor in an exemplary embodiment of the disclosure, there is provided a motor including: a housing that accommodates a stator that has a field coil and a rotor; an inverter that is provided in the housing; a voltage boosting circuit that has a reactor provided in the housing; and a coolant flow path that is provided at a position at which the coolant flow path overlaps with the inverter and the voltage boosting circuit in the housing in a diameter direction. The inverter has a control board that controls a drive current or a drive voltage and a drive element that is provided on a side of the housing with respect to the control board and supplies power to the field coil in accordance with control by the control board.

The above and other elements, features, steps, characteristics and details of the embodiments of the disclosure will become more apparent from the following detailed description of the embodiments with reference to the attached drawings.

DESCRIPTION OF THE EMBODIMENTS

In view of the aforementioned, the embodiments of the disclosure provide a motor capable of efficiently cooling a voltage boosting circuit.

Hereinafter, an embodiment for implementing the disclosure will be described in detail with reference to the accompanying drawings.

Figure 1:
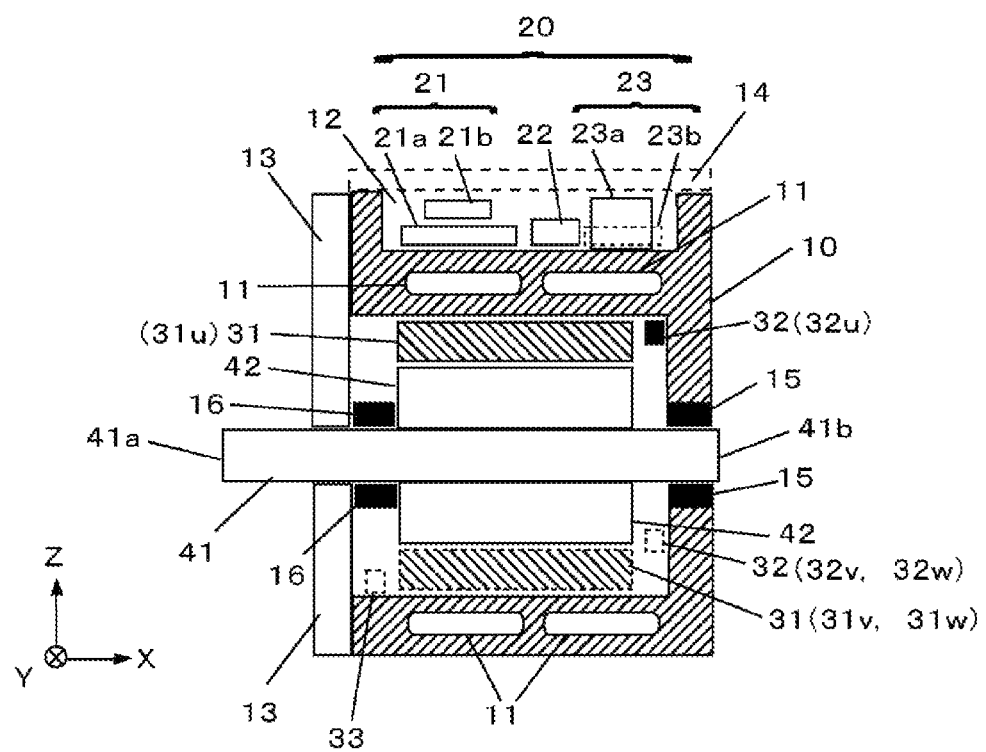
FIG. 1 is a sectional view illustrating a configuration example of a motor according to an exemplary embodiment of the disclosure.

FIG. 1 is a sectional view illustrating a configuration example of a motor according to a first embodiment in which the disclosure is applied to a brushless motor.

The motor includes a control circuit 20 that is accommodated in the housing 10, a stator 30 that has field coils 31 or the like that generate a magnetic field by a drive current in accordance with three-phase drive voltages, and a rotor 40 that is mounted such that the rotor 40 freely rotates about a rotation axis. Note that hereinafter, such a motor in which the control circuit 20 is accommodated in the housing 10 along with the stator 30 and the rotor 40 will be referred to as an electromechanical integration-type motor.

Figure 2:
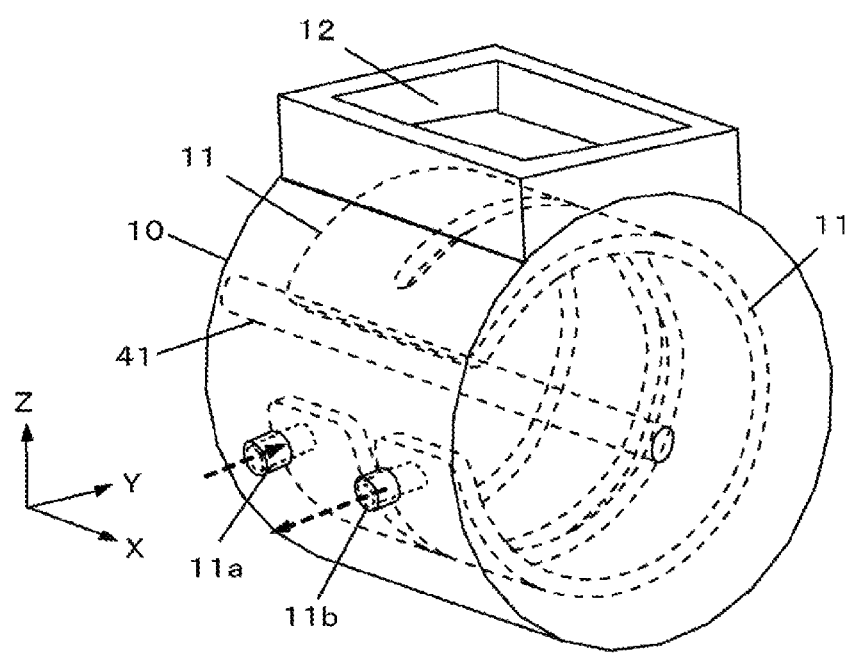
FIG. 2 is a perspective view illustrating configuration examples of a housing and a coolant flow path.
Figure 3:
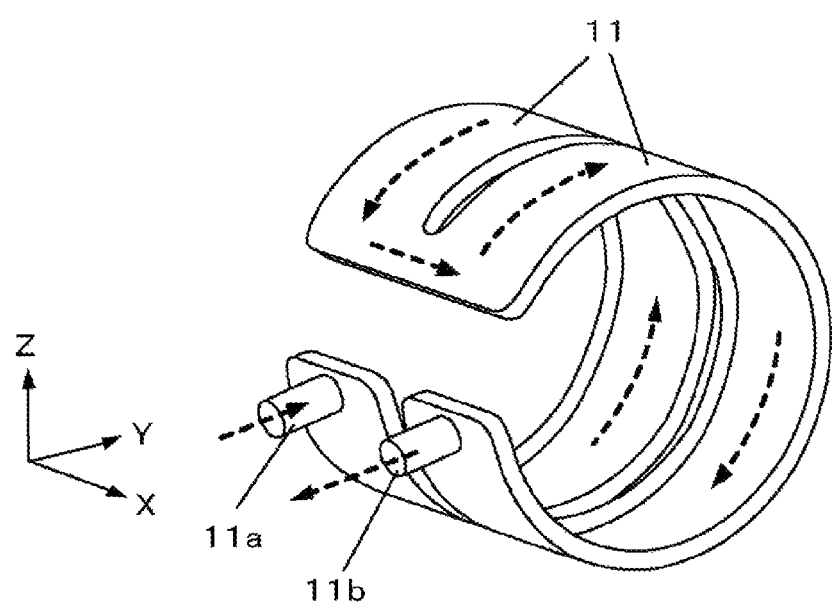
FIG. 3 is a conceptual diagram illustrating a state of a coolant flowing through the coolant flow path.

In the housing 10, a coolant flow path 11 is formed as illustrated in FIG. 2, for example. A flow-in part 11a through which the coolant is caused to flow in from the outside and a flow-out part 11b through which the coolant is flow out to the outside are provided at both ends of the coolant flow path 11. The flow-in part 11a and the flow-out part 11b line up on a rotation axis direction of the motor. As illustrated in FIG. 3, for example, the coolant that has flowed in from the flow-in part 11a is adapted to flow through the coolant flow path 11 and flow out from the flow-out part 11b. The housing 10 is cooled and the stator 30 and the control circuit 20 that are in contact with the housing 10 are cooled by circulation of the coolant. Also, the accommodation part 12 that accommodates the control circuit 20 is provided above the housing 10.

In addition, a cap 13 of a motor house in which the stator 30 and the rotor 40 are accommodated and an accommodation part cover 14 that covers the accommodation part 12 are provided in the housing 10. Bearings 15 and 16 that supports a motor shaft 41 of the rotor 40 are attached to the inside of the motor house.

The control circuit 20 includes an inverter 21 that generates a drive voltage to be supplied to the field coils 31 of the stator 30, a condenser 22 that smooths the voltage to be supplied to the inverter 21, and a voltage boosting circuit 23 that boosts the power source voltage. The inverter 21 and the voltage boosting circuit 23 are attached at positions at which the inverter 21 and the voltage boosting circuit 23 overlap with the coolant flow path 11 in the diameter direction of the motor. In other words, at least the coolant flow path 11 is provided at a position at which the coolant flow path 11 overlaps the inverter 21 and the voltage boosting circuit 23 in a direction away from the rotation center axis (the motor shaft 41) of the rotor 40, that is, the diameter direction (the Z direction in FIGS. 1 to 3 and 5) of the motor. In this manner, it is not necessary to provide the coolant flow path 11 at the tip of the center axis of the motor shaft 41, and it is possible to contribute to size reduction of the rotor 40 in the rotation center axis (the center axis of the motor shaft 41) direction.

Note that the distance between the voltage boosting circuit 23 and the inverter 21 is set such that parasitic inductance of the supply path that supplies the voltage output by the voltage boosting circuit to the inverter is equal to or less than a predetermined value. In addition, the condenser 22 is shared as a condenser that smooths the voltage output by the voltage boosting circuit 23 and as a condenser that smooths the voltage input by the inverter 21. The value of capacitance of the condenser 22 is set such that a ripple rate of the voltage supplied from the voltage boosting circuit 23 to the inverter 21 is equal to or less than a predetermined value.

The inverter 21 includes an insulated gate bipolar transistor (IGBT) module (hereinafter, simply referred to as IGBT) 21a that switches the voltage supplied from the voltage boosting circuit 23 via the condenser 22 and generates three-phase (a U phase, a V phase, and a W phase) drive voltages, a control board 21b, and a temperature sensor 21c that detects the temperature of the IGBT 21a or the like. The IGBT 21a is provided on the side of the housing 10 with respect to the control board 21b. Since the amount of heat generation of the IGBT 21a is greater than the amount of heat generation of the control board 21b, it is possible to efficiently cool the IGBT 21a by employing such arrangement.

In addition, the IGBT 21a includes three sets of, namely six switching elements (IGBT elements) in order to generate the three-phase drive voltages. Note that switching elements such as metal oxide semiconductor field effect transistors (MOSFET) or the like may be used instead of the IGBT elements. In addition, the IGBT 21a is attached to a bottom surface of the accommodation part 12 of the housing 10 for cooling. The control board 21b supplies a requested voltage value (requested voltage) to the voltage boosting circuit 23.

Figure 4:
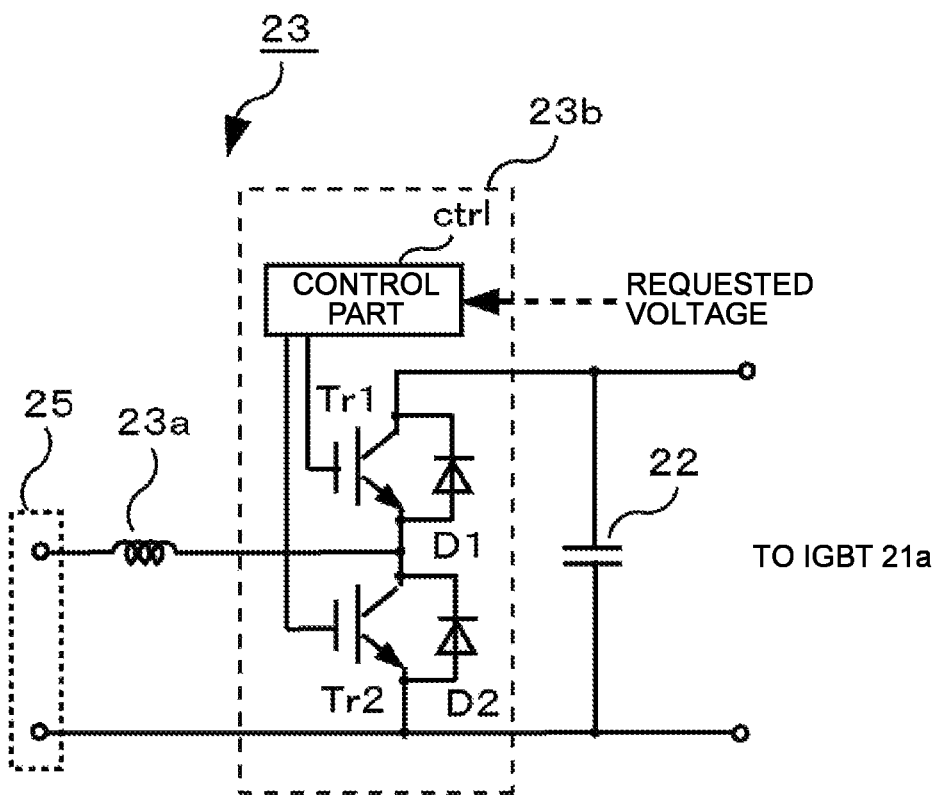
FIG. 4 is a circuit diagram illustrating a configuration example of a voltage boosting circuit.

The voltage boosting circuit 23 is a chopper-type voltage boosting circuit and includes a reactor 23a and a circuit board 23b on which circuit components such as switching elements and the like are mounted as illustrated in FIG. 4, for example. The reactor 23a is larger as compared with a case of a voltage lowering circuit and is attached to the bottom surface of the accommodation part 12 of the housing 10 separately from the circuit board 23b for cooling. The voltage boosting circuit 23 boosts the power source voltage supplied at the voltage boosting ratio in accordance with the requested voltage from the control board 21b via the power source connector 25 and supplies the power source voltage to the IGBT 21a. In addition, switching elements (Tr1 and Tr2) such as FETs or the like that form the voltage boosting circuit, diodes or the like (D1 and D2) for rectification, and a control part ctrl that performs control and the like of ON and OFF timings of the switching elements in accordance with the requested voltage from the control board 21b are mounted on the circuit board 23b. The control part ctrl boosts the power source voltage to the requested voltage and supplies the voltage to the IGBT 21a by controlling the ON and OFF timings of the switching elements in accordance with the requested voltage from the control board 21b.

The field coils 31 of the stator 30 includes a field coil 31u to which the U-phase drive voltage is supplied from the IGBT 21a, a field coil 31v to which the V-phase drive voltage is supplied, and the field coil 31w to which the W-phase drive voltage is supplied. Also, the stator 30 is provided with position sensors 32 that detect an angle of the rotor 40 and a temperature sensor 33 that detects the temperature of the motor. The position sensors 32 are arranged at every 120° in the surroundings of the rotor, for example, includes three magnetic sensors (32u, 32v, and 32w) such as hall elements that detect magnetism of the rotor 40, and detects the angle of the rotor 40. Note that the angle of the rotor 40 may be detected by another mechanism such as a rotor re-encoder or the like. The temperature sensor 33 includes a temperature detection element such as a thermistor, detects the temperature of the motor such as the field coils 31, and supplies the temperature to the control board 21b of the inverter 21.

The rotor 40 includes the motor shaft 41 provided such that the motor shaft 41 is freely turned about the rotation axis and a permanent magnet (hereinafter, simply referred to as a magnet 42) attached to the motor shaft 41. The rotor 40 rotates about the motor shaft 41 as the center in accordance with the magnetic field generated by the field coils 31 and outputs drive force from one end (output end) of the motor shaft 41.

Figure 5:
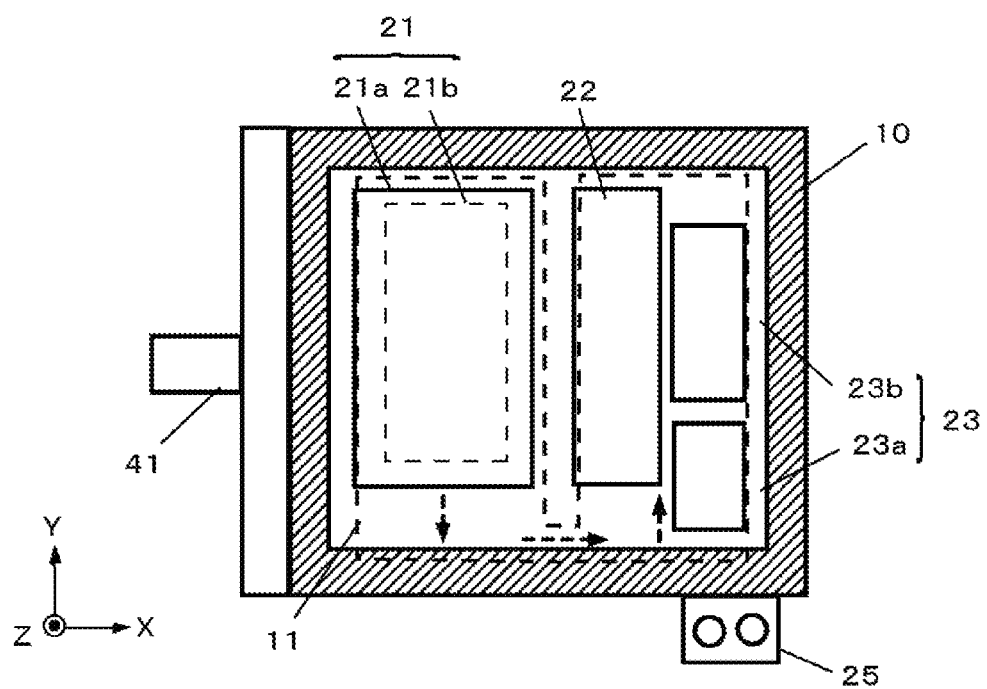
FIG. 5 is an upper view illustrating an arrangement example of a control circuit.

FIG. 5 is an upper view illustrating an arrangement example of the control circuit 20 in the accommodation part 12.

Note that the arrow of the dashed line in FIG. 5 represents a flow of the coolant that flows through the coolant flow path 11.

The inverter 21 and the voltage boosting circuit 23 are arranged in the rotation center axis (the center axis of the motor shaft 41) direction of the rotor 40. In this manner, it is not necessary to provide the coolant flow path 11 at the tip of the center axis of the motor shaft 41, and it is possible to contribute to size reduction of the motor.

Also, the IGBT 21a of the inverter 21 is arranged on the upstream side of the coolant flow path 11 with respect to the reactor 23a of the voltage boosting circuit 23. Since heat generation of the IGBT 21a is greater than that of the reactor 23a, it is possible to improve cooling efficiency of the IGBT 21a and to improve cooling efficiency of the entire motor by employing such arrangement.

In addition, the reactor 23a is arranged on the upstream side of the coolant flow path 11 with respect to the condenser 22 of the reactor 23a. That is, the condenser 22 is arranged on the downstream side of the coolant flow path with respect to the IGBT 21a and the reactor 23a. Since heat generation of the reactor 23a is greater than heat generation of the condenser 22, it is possible to improve cooling efficiency of the reactor 23a and to improve cooling efficiency of the entire motor by employing such arrangement.

Figure 6:
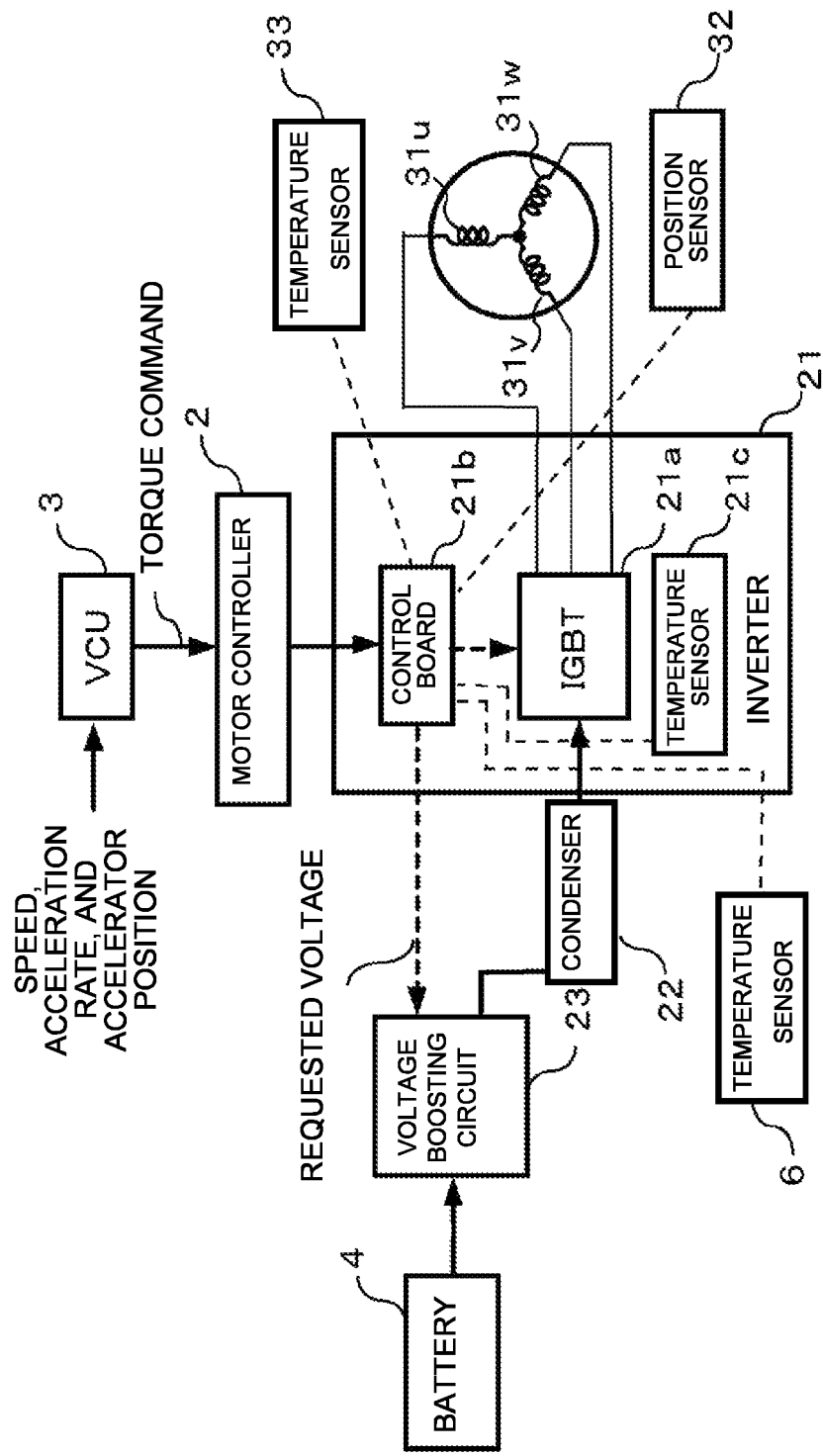
FIG. 6 is a block diagram illustrating a configuration example of a motor control device.
Figure 7:
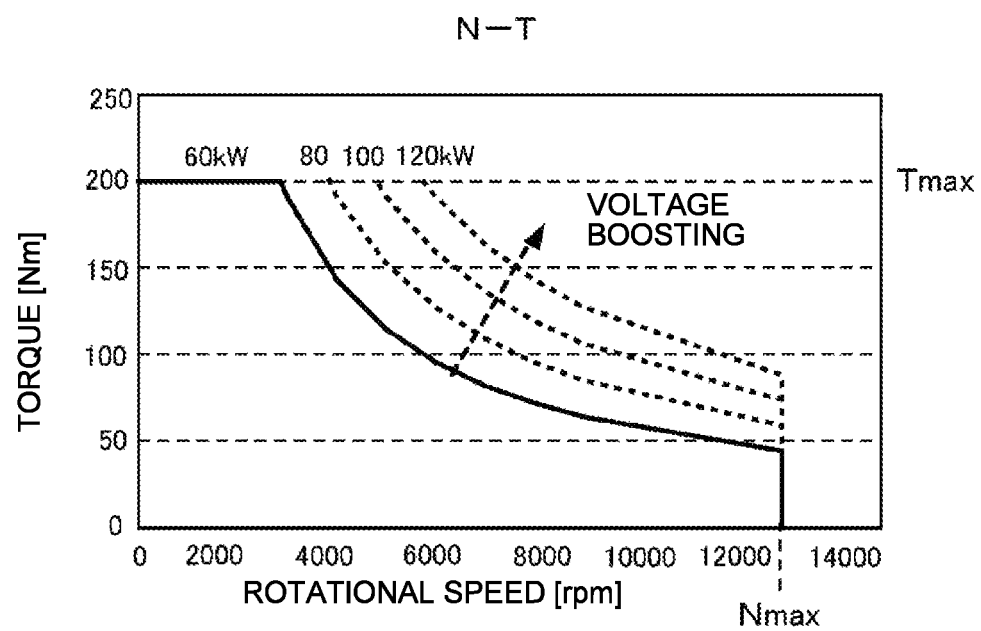
FIG. 7 is a diagram illustrating a relationship of power consumption of the motor, a rotational speed N of the motor, and a torque T.

The motor configured as described above is driven by a control system illustrated in FIG. 6, for example.

The control system includes a motor controller 2 that controls operations of the motor, a vehicle control unit (VCU) 3 that supplies a torque designation value (torque command) to the motor controller 2 in accordance with vehicle states such as a speed, an acceleration, and an accelerator position of a vehicle or the like, a battery 4 that supplies the power source voltage to the voltage boosting circuit 23, and a temperature sensor 6 that detects a temperature or the like in the surroundings of the motor.

The VCU 3 generates a torque command indicating a value of a necessary torque in accordance with vehicle states such as a current accelerator position, a vehicle speed, an acceleration rate at the time of acceleration or deceleration and supplies the torque command to the motor controller 2. The motor controller 2 controls operations of the control board 21b in accordance with the supplied torque command.

The control board 21b compares the voltage detected by the position sensors 32, for example, with a predetermined reference voltage and detects an angle of a rotor 40 in units of 60° in accordance with a result of comparison. In addition, the control board 21b detects a rotational speed of the motor on the basis of the voltage detected by the position sensors 32. Note that the rotational speed of the motor may be detected by using a sensor that is different from the position sensors 32.

The motor controller 2 calculates necessary power that is necessary to drive the motor in accordance with the torque command from the VCU 3. A relationship between the rotational speed N of the motor and the torque T changes in accordance with power consumption of the motor as illustrated in FIG. 3, for example. A relationship between the rotational speed N of the motor and the torque T is as represented by the solid line in the drawing when the power consumption is 60 kW and is as represented by the respective dashed lines when the power consumption is 80 kW, 100 kW, and 120 kW, for example. Therefore, the motor controller 2 calculates the power consumption with which a necessary torque is obtained as necessary power in accordance with the torque command and the rotational speed of the motor on the basis of such a relationship and controls operations of the control board 21b. The control board 21b calculates a voltage value and a current value that are necessary to drive the motor in accordance with the control performed by the motor controller 2. In addition, the control board 21b supplies the calculated voltage value as a requested voltage to the control part ctrl of the voltage boosting circuit 23. The control part ctrl of the voltage boosting circuit 23 supplies the voltage V boosted at a predetermined voltage boosting ratio from the voltage ($V_{BATT}$) of the battery 4 in accordance with the voltage requested by the control board 21b to the inverter 21.

The control board 21b controls switching performed by the respective switching elements of the IGBT 21a in accordance with the current value calculated as described above and causes the switching elements to generate three-phases (the U phase, the V phase, and the W phase) drive voltages. The drive voltages are generated by performing pulse width modulation (PWM) control such that an average value of the drive current flowing through the field coils 31 (field coils 31u to 31w) of the motor (hereinafter, simply referred to as a current value) is a predetermined current value in a case of sine wave drive, for example. The control board 21b controls a pulse duty ratio of the drive voltages in accordance with the aforementioned current value.

The drive voltages of the respective phases generated by the IGBT 21a are supplied to the respective field coils 31u to 31w of the stator 30, and the drive current in accordance with the drive voltages flows through the respective field coils 31u to 31w, and a torque is generated at the rotor 40 by mutual actions between the magnetic field of the field coils 31u to 31w and the magnet of the rotor. The torque is output to the outside via an output end of a motor shaft.

As described above, it is possible to efficiently cool the drive element of the inverter and the voltage boosting circuit (particularly, the reactor) by arranging the coolant flow path at the position at which the coolant flow path overlaps with the inverter and the voltage boosting circuit in the embodiment. This can contribute to size reduction of the motor.

In addition, it is not necessary to provide the coolant flow path at tips on the output side (41a) and the opposite output side (41b) of the axis of the motor (the center axis of the motor shaft 41 that is the rotation center axis of the rotor 40) by the inverter, the voltage boosting circuit, and the coolant flow path overlapping with each other in the diameter direction, and it is possible to contribute to size reduction in the direction of the axis of the motor (the rotation center axis of the rotor 40).

Although the drive voltage of the motor is generated by sine wave drive in the aforementioned embodiments, for example, the drive voltage may be generated by rectangular wave drive instead of the sine wave drive.

In addition, although the case in which the drive control of the brushless motor is performed, for example, has been described in the aforementioned embodiments, the embodiment of the disclosure can be applied to a case in which drive control of a three-phase synchronous motor or the like is performed by using an inverter.

In addition, although the voltage boosting circuit 23 has a configuration including the reactor 23a and the circuit substrate 23b in the aforementioned embodiment, the switching elements on the circuit board 23b may be provided outside the circuit board 23b, and the circuit board 23b may be attached such that the switching elements are brought into contact with a bottom surface of the accommodation part 12, for example.

Features of the above-described embodiments and the modifications thereof may be combined appropriately as long as no conflict arises.

While embodiments of the disclosure have been described above, it is to be understood that variations and modifications will be apparent to those skilled in the art without departing from the scope and spirit of the disclosure. The scope of the disclosure, therefore, is to be determined by the following claims.

What is claimed is:

1. A motor comprising:
a housing that accommodates a stator that has a field coil and a rotor;
an inverter that is provided in the housing;
a voltage boosting circuit that has a reactor provided in the housing; and
a coolant flow path that is provided at a position at which the coolant flow path overlaps with the inverter and the voltage boosting circuit in the housing in a diameter direction,
wherein the inverter has a control board that controls a drive current or a drive voltage and a drive element that is provided on a side of the housing with respect to the control board and supplies power to the field coil in accordance with control from the control board,
wherein the coolant flow path extends in a circumferential direction, and
while viewing from a rotation center axis direction of the rotor, at least a part of the coolant flow path is located between the stator and the inverter in the diameter direction, and at least a part of the coolant flow path is further located between the stator and the voltage boosting circuit in the diameter direction,
wherein the coolant flow path has a first coolant flow path, a second coolant flow path and a connecting flow path,
the first coolant flow path and the second coolant flow path are arranged in the rotation center axis direction of the rotor,
the connecting flow path is connected with the first coolant flow path and the second coolant flow path,
a coolant flowed into the first coolant flow path flows from one side in a circumferential direction toward another side in the circumferential direction and flows into the second coolant flow path via the connecting flow path, the coolant flowed into the second coolant flow path flows from the another side in the circumferential direction toward the one side in the circumferential direction, an accommodation part, configured to accommodate the inverter and the voltage boosting circuit, is disposed on the housing, and when viewing from the rotation center axis direction of the rotor, the connecting flow path does not overlap with the inverter and the voltage boosting circuit in the diameter direction, a flow-in part is disposed on the first coolant flow path, a flow-out part is disposed on the second coolant flow path, the flow-in part and the flow-out part line up on a rotation axis direction of the motor.

2. The motor according to claim 1, wherein the inverter and the voltage boosting circuit are arranged in the rotation center axis direction of the rotor.

3. The motor according to claim 1, wherein the drive element is arranged on an upstream side of the coolant flow path with respect to the reactor.

4. The motor according to claim 1, wherein a condenser that smooths a voltage output by the voltage boosting circuit is a shared condenser that smooths a voltage input by the inverter.

5. The motor according to claim 4, wherein the condenser is arranged on a downstream side of the coolant flow path with respect to the drive element and the reactor.

6. The motor according to claim 4, wherein a distance between the voltage boosting circuit and the inverter is set such that a parasitic inductance of a supply path through which the voltage output by the voltage boosting circuit is supplied to the inverter is equal to or less than a predetermined value.

7. The motor according to claim 4, wherein a capacitance of the condenser is set such that a ripple rate of a voltage supplied from the voltage boosting circuit to the inverter is equal to or less than a predetermined value.

* * * * *